UNITED STATES PATENT OFFICE.

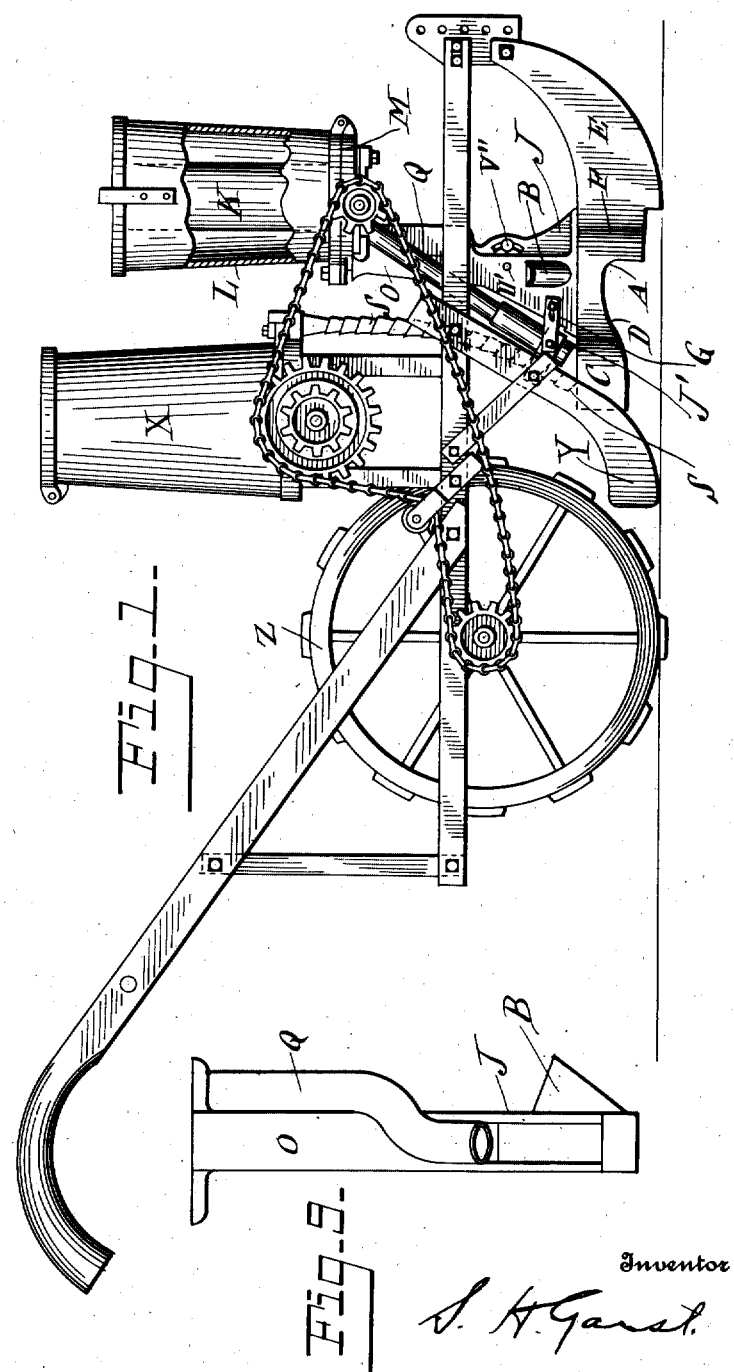

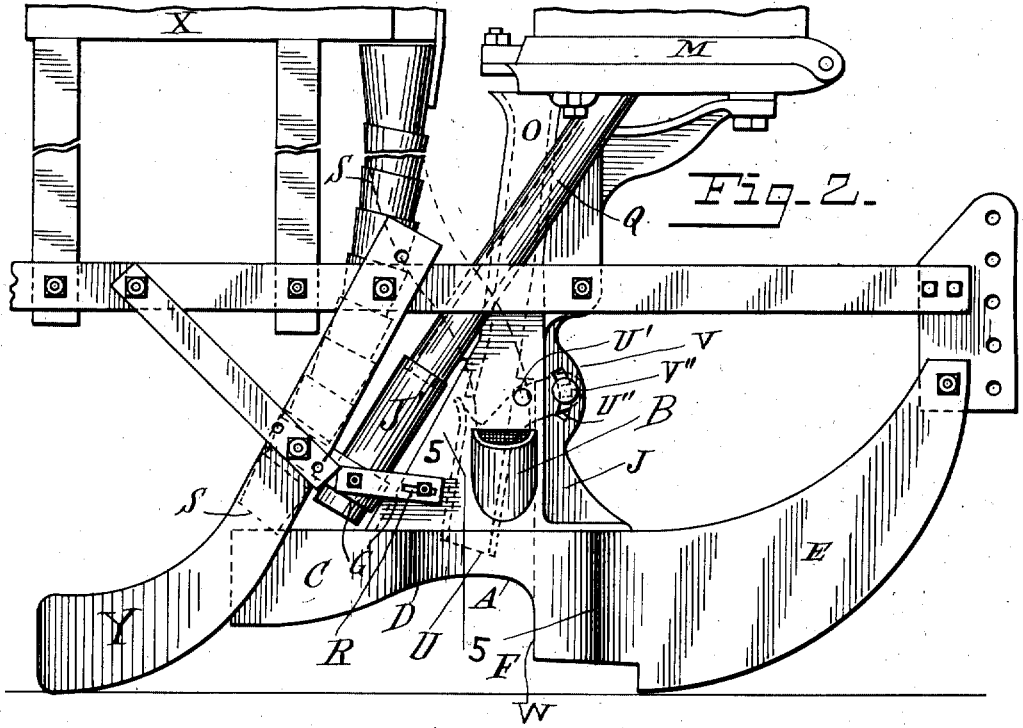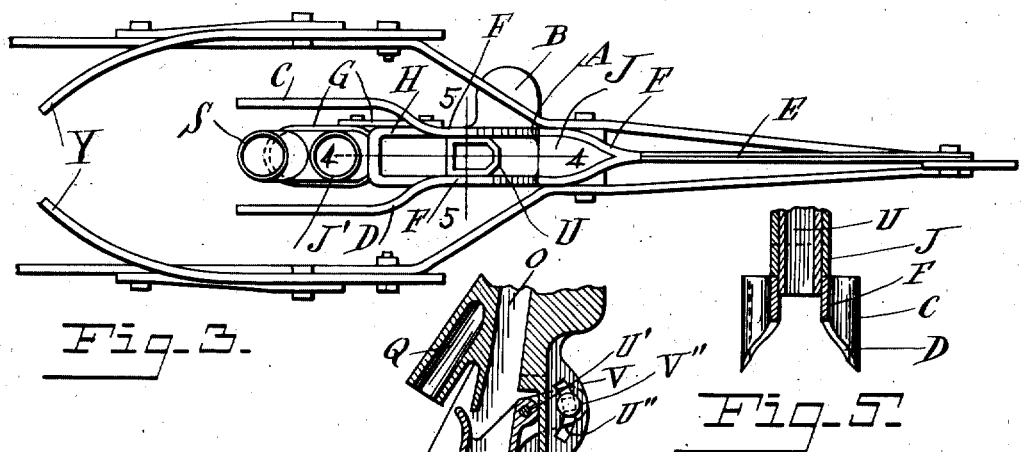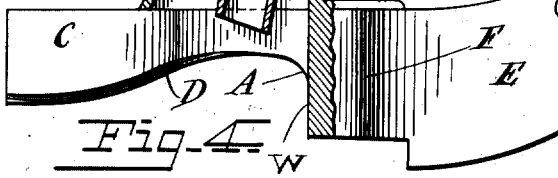

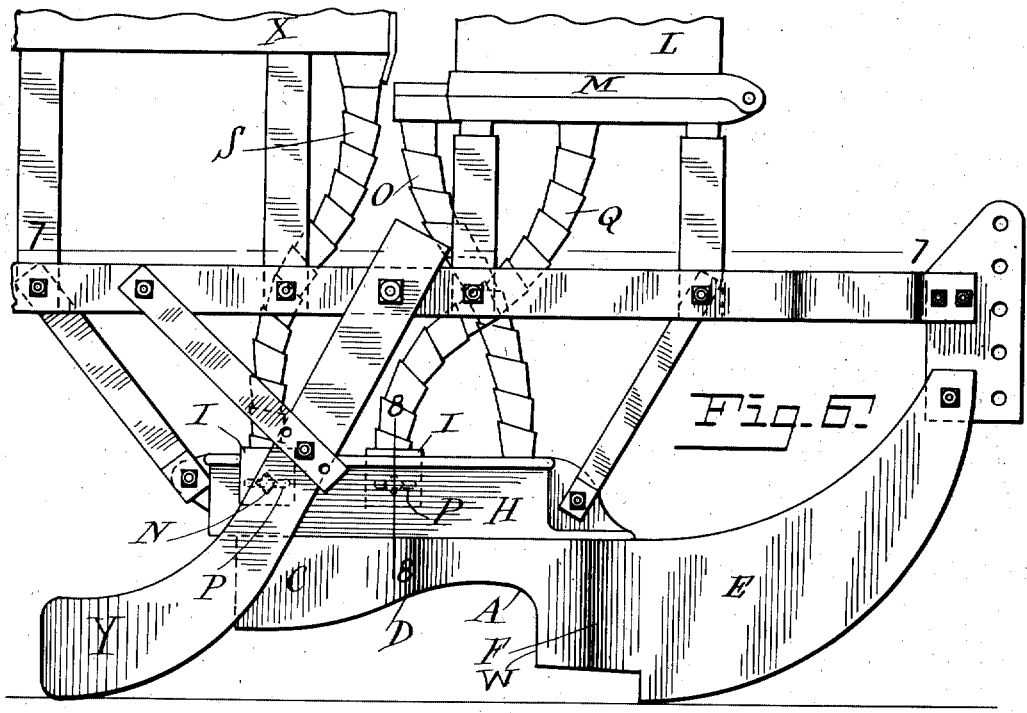
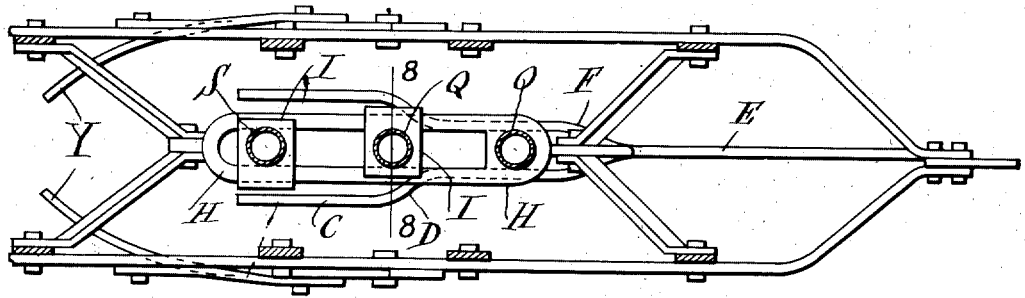
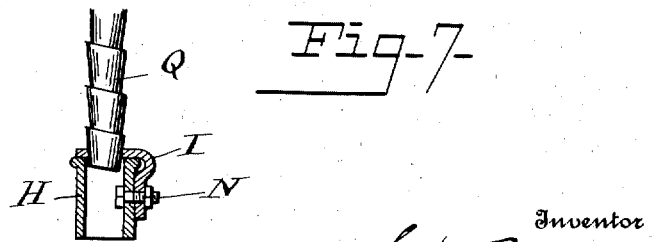

STEPHEN H. GARST, OF MOLINE, ILLINOIS, ASSIGNOR TO D. M. SECHLER IMPLEMENT & CARRIAGE CO., OF MOLINE, ILLINOIS.

CORN-PLANTER.

1,229,604.   Specification of Letters Patent.   Patented June 12, 1917.

Application filed August 9, 1916. Serial No. 113,854.

*To all whom it may concern:*

Be it known that I, STEPHEN H. GARST, a citizen of the United States, residing at Moline, in the county of Rock Island and State of Illinois, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in machines for planting corn and other grain in hills or drill rows of varying depth and to sow fertilizer with the seed and to properly cover both seed and fertilizer. Experience teaches that it is not good practice to plant seed and fertilizer in the same place, that is to say in contact with each other, owing to the liability of the fertilizer through its strong chemical nature to injure the germs or tender roots of the germinating seed or young plants. Experience also teaches that the best method of planting, in view of the conditions outlined above, is to first deposit the seed in the furrow and then cover the same lightly with earth or soil and upon this covering deposit the fertilizer and to then cover the whole with earth or soil. With the present improvements, two kinds of seed may be planted alternately and fertilizer delivered at the same time. One kind of seed may be planted deeper than the other and the fertilizer may be planted under the seed or the seed under the fertilizer, in which case a double seed hopper may be employed or a single seed hopper may be employed as the character of the planting may require. In planting it is necessary that the soil shall fall into the furrow to cover the seed and the fertilizer and to fill the furrow properly as the planting progresses, the seed and fertilizer being deposited in a manner hereinafter more particularly set forth. To accomplish this a certain construction of runner has been provided which comprises an important part of the present improvements as well as the shank or standard to which the runner is attached and through which the seed is dropped and other features of the planter, as will be hereinafter more fully described in connection with the accompanying drawings.

Referring to the accompanying drawings, Figure 1 is a side elevation of a corn planter having my improvements applied thereto. This view shows means for sowing two different kinds of seed from a double hopper consisting of one cylinder telescoped over another, as well as the fertilizer hopper. Fig. 2 is an enlarged side elevation of the runner, shank, feed spouts, etc., other parts being broken away; Fig. 3 is a bottom plan view of the runner and other parts immediately associated therewith; Fig. 4 is a section on the line 4—4 of Fig. 3; Fig. 5 is a section through the narrow portion of the runner and adjacent feed spouts or on the line 5—5 of Fig. 2; Fig. 6 is an elevation similar to Fig. 2 in which the standard or shank is dispensed with and a shoe is employed in place thereof whereby the changing of the feed spouts from one position to the other is facilitated in cases where two characters of seed are planted; Fig. 7 is a sectional view looking downwardly on the line 7—7 of Fig. 6; Fig. 8 is a detail sectional view of the shoe and an adjustable clip by means of which the seed spouts may be adjusted to sow the seed at different depths where two characters of seed are sown at the same time, as well as to change the position of the fertilizer spout; Fig. 9 is a detail elevation of an arrangement of a seed spout showing it extended partially in the rear of the standard, as shown in Fig. 1.

In a detail description of the invention, similar reference characters indicate corresponding parts.

Referring to the drawings, in detail, E designates the main forward part of a bifurcated furrow opener or runner. The structural characteristics of said runner are important, and in order to bring about a full appreciation and understanding of said runner, it will be described with some particularity. The blades forming the same are welded at their forward portions in the form of a single up-curved blade from which the sides diverge in gradual curves from a point adjacent to the front end of the shank or standard J, as shown in Fig. 3. The runner is united to said shank or standard J and to the front end of the planter frame in the usual manner. The sides F—F of the runner continue rearwardly from the furrow-opening part in parallel relation one to the other and are cut out from the lower edges to a considerable depth as at A—A. These cut-out portions are approximately greater than half the depth of said sides. The purpose of these cut-out portions is to provide large openings at these points of the runner for the soil forming the walls of the furrow to freely fall into said furrow and to cover the seed or fertilizer or both. The rearward extensions D—D of the runner are formed by gradual rearward curves which extend from the cut-out side portions thereof and terminate in spreading extensions C—C which lie approximately parallel with each other and on the outside of the furrow. The gradually curved portions D—D are instrumental in preventing roots, trash, etc., from accumulating on the rearward sides of the runner. The soil is forced through the openings A—A in the sides of the runner and into the groove or furrow by the extensions C—C, the rearmost parts of the runner consisting of these extensions C—C being substantially wider than the forward parts F—F thereof. The outline of the essential shape of the runner is substantially shown in Fig. 3. The approximate width of the runner between the rearmost extensions C—C is about two inches greater than the width between the parts F—F. Therefore, the curvatures D—D provide an offset of approximately one inch on each side of the runner. The curvatures at D—D are made on easy curves in order that the soil will not stick to the sides of the runner. As the planter moves forward, the runner at the points F—F makes a furrow approximately one and one-half inches wide. The rear extensions C—C of said runner being approximately three and one-half inches apart, it will be evident that these portions of the runner will remove approximately one inch of the wall of the furrow made by the parts F—F. In practice, this causes a constant stream of earth to flow in between the rear extensions C—C of the runner thereby completely covering the first article dropped within the furrow whether it be seed or fertilizer. The dimensions stated above may be varied within certain limits without departing from the essential features of the runner which, as before stated, comprise deep openings in the sides of the runner in the immediate rear of which the sides of the runner are given easy or gradual curves and spread outwardly whereby an opposite feed of the earth from the side walls of the furrow is obtained. The flow of the soil through the openings A—A into the furrow made by the side parts F—F is substantially uniform. This result is obtainable under any condition and in any kind of soil in which a planter can be operated, owing to the fact that the rear extensions C—C slice a part of the earth from the walls of the furrow in a manner similar to the action of the share or shovel of a plow. As has been stated, the runner in combination with the shank or standard and hopper is capable of planting two kinds of seed alternately and fertilizer at the same time. In such use, a well known type of double seed hopper may be employed consisting briefly of a hopper K and a hopper L, the former being inclosed within the latter with surrounding space. In the bottom of the hopper K a well known seed-dropping plate is provided and the hopper L is secured to the rim M. In the space between the rim M and the hopper K another well known form of seed plate is placed. These two seed plates revolve together and may be made in one piece with two concentric rows of holes near the outer edge, the holes of one alternating with those of the other. Each of these hoppers has a separate feed outlet and a separate spout or channel extending from the base of the hoppers to the entrance into the runner. The hopper L has its outlet in a spout O where it discharges into the standard J and continues downwardly in substantially a straight line between the runner sides F—F. The hopper K has its outlet in a spout Q which continues downwardly and joins a tube J' extending between the rearward extensions C—C of the runner. Inside of the lower part of the standard J an adjustable spout U is pivoted at U'. This spout U has an arm U" which projects forwardly through a suitable opening in the standard and is secured to a slotted projection V which is a part of the standard J and is held into its adjusted position by a bolt V'. The spout U may be thus adjusted to cause the lower end thereof to be moved backward or forward between the sides F—F of the runner. The forward movement of the lower end of said feed spout is utilized for planting the seed deep and the farther forward the position of said spout is the deeper the seed will be planted. On the other hand, the backward movement of said spout is utilized for planting the seed shallow and the farther backward the position of said spout is the shallower the seed will be planted. In planting corn and beans or peas, for example, it is desirable to plant the beans and peas shallower than the corn. In Fig. 1 the corn drops through the standard J through the inside spout U and lands in the furrow as near the shoulder W of the cut-out part of the runner as possible, therefore the seed gets into the furrow before any soil has fallen in from the sides thereof. The seeds are thus deposited at the lowest point of the furrow. The beans or peas, as the case may be, drop through the spouts Q and J' and land between the rear runner extensions C—C after the furrow is partly filled and are, therefore, not as deep in the soil as the corn. The spout J' and the adjustable spout U enable such planting of different seeds one in the rear of the other, such for example, as beans or peas in the rear of corn, the latter at a greater depth. In case it is desirable to use fertilizer, a hopper X is mounted on the planter from which is fed the fertilizer through a spout S from which it is deposited between the runner extensions C—C and is covered by the soil which falls in behind said runner extensions. In order to prevent any possibility of the seed and fertilizer not being covered properly and thoroughly, a pair of drag-shovels Y or any equivalent means are provided which entirely fill and cover the furrow made by the runner. These drag-shovels are suitably mounted on the frame of the planter with their lower ends curved rearwardly and inwardly. The soil is then pressed down and rounded into a suitable ridge by the planter wheels Z. In some instances, it is desirable to deposit the fertilizer under the seed, for example, in planting cotton seed. To accomplish this a pocket B is provided in the side of the shank or standard J and opens into the cavity within said shank. In this case the fertilizer spout S may be carried in said pocket and the fertilizer discharging through said spout be delivered to the furrow between the part F—F of the runner and near the shoulder W. The seed spout U may then be adjusted so that the lower end of said spout is in the rear of the pocket B. It will thus be seen that in order to change the feed of fertilizer from above to below the seed, the result merely involves the change in the location of the fertilizer spout S. When the fertilizer spout S is in the rearward position, it may be held in such position by means of suitable clips G secured to the rear portion of the standard J, and secured to the fertilizer spout S and the feed spout Q. These spouts may be adjusted backward and forward relative to the runner to vary the depth of the seed or fertilizer by means of a slot R in a portion of said clips G through which a bolt passes in uniting the same to the shank or standard J. In Fig. 6, another means and method of changing the position of the seed and fertilizer with respect to the furrow is shown but which does not, however, affect in any way the essentials of my improvements. In this case the shank or standard J is dispensed with and on the top of the runner is suitably mounted a shoe H which has an opening extending the length thereof or substantially so which receives the coil spouts from the double seed hopper as well as the spout from the fertilizer hopper. By changing these spouts from one position to another within said shoe opening, the order of dropping the seed and fertilizer may be conveniently changed. The spout S in this case, leading from the fertilizer hopper X, is in the rearward position in the shoe H, and the spout Q from the interior seed hopper K is in the central position and the spout O from the outside seed hopper L is in the forward position in said shoe. Suitable angle clips I may be employed for supporting the hopper spouts in their proper positions in the opening in the shoe H. These clips may be secured to the shoe H by means of bolts N which are movable back and forth in slots P in a side of the shoe so that it is possible to adjust said clips back and forth and by so doing to vary the depth of the seed or fertilizer.

While I have with some particularity described my several improvements in seed planters especially in connection with the structural character of the runner, together with the facility with which and the means by which the seed spouts and fertilizer spout may be changed in their operative positions to accommodate a variety of planting to meet modern requirements, I do not wish to limit myself to any particular structure or feature that may be varied to any extent without departing from the underlying principles involved and results obtainable from my aforesaid improvements. The objects and purposes of my improvements are to provide a runner for planters having a capacity for effectually forming a covering of soil in the furrow as the planter proceeds, to cover up the first deposit of seed or the fertilizer or vice versa as the case may be, and means for changing at will the positions of the various feed spouts relative to the parts of the runner or the furrow made thereby.

Having described my invention, I claim:

1. A seed planter runner provided with a forward furrow-opening portion, intermediate side portions cut out from their lower edges to a substantial depth to provide deep openings in the runner for the soil to fall into the furrow from the walls thereof, said intermediate side portions extending rearwardly in outwardly lying sides which join said intermediate side portions by substantial curvatures whereby the soil is drawn into the furrow as the runner advances.

2. A seed planter runner provided with a forward furrow-opening portion, intermediate side portions cut out from their lower edges to a substantial depth to provide openings in the runner for the soil to fall through into the furrow, said intermediate side portions being extended in rearward outwardly-lying side portions which lie on the outer sides of the furrow and are adapted to draw the soil into the furrow as the runner advances, the lower edges of said rearward outwardly-lying portions joining the edges of the cut-out portions in substantially broad curvatures.

3. In a planter, a runner comprising a forward furrow-opening portion extending rearwardly in side portions which lie in inner and outer parallel planes, the portions in the inner planes being joined to those in the outer planes by outwardly extending broad curvatures, and the portions of said sides lying in the inner planes being cut away from their lower edges to a substantial depth in the rear of the furrow-opening portion to allow the soil to fall through the runner into the furrow.

4. A seed planter runner provided with a forward furrow-opening portion, the sides of the runner extending rearwardly from the furrow-opening portion being perpendicularly cut away from the lower edge thereof to provide substantial side openings adjacent to the rearward terminal of the furrow-opening portion, and the entire portions of said runner extending rearwardly from said perpendicular cut-away portions being extended outwardly beyond the perpendicular cut-away portions.

5. In a seed planter, the combination with a runner having a rearward extension the sides of which are recessed, of a standard mounted on said runner, a swinging feed spout mounted in said standard, and means for adjusting said spout for deep or shallow planting.

6. In a seed planter, the combination with a runner having a rearward extension recessed as described, of a standard mounted thereon having a pocket in the side thereof for the insertion of a feed spout, a swinging feed spout on the interior of said standard, and means for adjusting said swinging feed spout for deep or shallow planting.

7. In a seed planter, a runner having a forward furrow-opening portion, the side portions thereof in the rear of the furrow-opening portion being cut away from their lower edges to provide substantially large openings through which the soil may readily fall into the furrow, a plurality of feed spouts, and means for adjusting said feed spouts relative to the cut-away portion of the runner.

8. In a seed planter, a runner provided with a forward furrow-opening portion, side portions cut away to provide substantially large openings in the sides of the runner in the rear of the furrow-opening portion, said side portions being extended outwardly in rearward portions beyond the sides of the furrow, a plurality of feed spouts arranged in interchangeable positions relative to the runner, and means for adjusting and supporting said feed spouts relative to the cut-away portion of the runner.

9. In a seed planter, a runner having a furrow-opening portion, and the sides of which adjacent to the furrow-opening portion are cut-out to provide openings in the sides of the runner through which the soil may fall into the furrow, and the rear portion of said runner terminating in dirt scrapers which travel on the outside of the furrow, a plurality of shiftable feed spouts, and means for supporting said feed spouts in different positions relative to the side portions of the runner having said openings.

In testimony whereof I affix my signature in presence of two witnesses.

STEPHEN H. GARST.

Witnesses:
RAYMOND T. COLSON,
O. M. STOWE.